United States Patent
Hatano

(10) Patent No.: US 7,835,234 B2
(45) Date of Patent: Nov. 16, 2010

(54) OBJECTIVE LENS DRIVING DEVICE AND OPTICAL DISC APPARATUS

(75) Inventor: Shinya Hatano, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 427 days.

(21) Appl. No.: 12/000,933

(22) Filed: Dec. 19, 2007

(65) Prior Publication Data

US 2008/0259774 A1 Oct. 23, 2008

(30) Foreign Application Priority Data

Dec. 22, 2006 (JP) ............................ 2006-345282

(51) Int. Cl.
*G11B 7/00* (2006.01)
(52) U.S. Cl. .................. 369/44.14; 369/44.15
(58) Field of Classification Search ............... 369/44.15
See application file for complete search history.

(56) References Cited

U.S. PATENT DOCUMENTS 6,344,936 B1 * 2/2002 Santo et al. ................. 359/824
7,203,951 B2 * 4/2007 Kawano et al. ............. 720/683
2004/0190402 A1 9/2004 Matsui
2005/0147000 A1 * 7/2005 Kim et al. ................. 369/44.15
2007/0147197 A1 * 6/2007 Huang et al. ............. 369/44.15

FOREIGN PATENT DOCUMENTS

| EP | 1 124 222 A2 | 8/2001 |
| EP | 1 367 576 A2 | 12/2003 |
| JP | 2002-237067 | 8/2002 |
| JP | 2006-024266 | 1/2006 |
| WO | WO 2005/066945 A1 | 7/2005 |

* cited by examiner

*Primary Examiner*—Lixi Chow
(74) *Attorney, Agent, or Firm*—Morgan Lewis & Bockius LLP

(57) ABSTRACT

Both of two permanent magnets which are arranged in an objective lens driving device are multipole magnetized magnets having rectangular parallelepiped shapes. The two permanent magnets have inverse N-S polarity at a part of surfaces which face each other. Focusing coils and tracking coils which are set up on a lens holder are disposed such that effective portions which are sides of the respective coils that face each other to generate driving force by electromagnetic force action with the permanent magnets, act with different direction magnetic fields respectively.

2 Claims, 8 Drawing Sheets

(RADIAL DIRECTION)

OBJECTIVE LENS DRIVING DEVICE AND OPTICAL DISC APPARATUS

This application is based on Japanese Patent Application No. 2006-345282 filed on Dec. 22, 2006, the contents of which are hereby incorporated by reference.

BACKGROUND OF THE INVENTION

1. Field of the Invention

The present invention relates to an optical disc apparatus which performs reproducing of information recorded on an optical recording medium and recording of information on an optical recording medium, in particular, the present invention relates to an objective lens driving device which drives an objective lens that is arranged in the optical disc apparatus.

2. Description of Related Art

An optical recording medium such as a compact disc (hereinafter referred to as a CD), or a digital versatile disc (hereinafter referred to as a DVD) has become popular. In addition, recently, to increase amount of information to be recorded on the optical recording medium, a study about high density recording on the optical recording medium is advanced, and for example, an optical recording medium which is made for high density recording such as a Blu-ray disc (hereinafter referred to as a BD) is being put to practical use. Recording and reproducing of these optical recording media are performed utilizing an optical disc apparatus.

On the optical disc apparatus, an objective lens is arranged to condense a laser beam which is emitted from a light source on a recording surface of the optical recording medium. In case where recording or reproducing of the optical recording medium is performed utilizing the optical disc apparatus, position of the objective lens is controlled by an objective lens driving device in order that a focal point of the objective lens is always kept on the recording surface of the optical recording medium despite of waving and the like of the optical recording medium, and that a position of the beam spot which is formed by condensing of the objective lens is not displaced from track which is formed on the optical recording medium.

As above described, technology for high density recording on the optical recording medium is advanced, and based on this, high accuracy for driving accuracy of the objective lens driving device has also been required. Above all, in case where recording or reproducing of the optical recording medium is performed by the optical disc apparatus, it is necessary that the laser beam is input vertically to the recording surface of the optical recording medium from the objective lens, and it is required that a phenomenon in which the objective lens is tilted (tilting) because harmful torque is generated when the objective lens is driven by the objective lens driving device, is suppressed.

About this point study has been conventionally performed, for example, technology is reported in JP-A-2006-024266 and JP-A-2002-237067. In JP-A-2006-024266, an objective lens driving device is proposed which has a structure in that a region of a rectangular parallelepiped magnet which is arranged on the objective lens driving device, is cut two times in laterally and vertically and magnetized, and focusing coils and tracking coils are disposed in cross shape. It says that according to this, variation in direction of magnetic field and its magnitude become small and the tilting of the objective lens when it is driven can be suppressed small.

Further in JP-A-2002-237067, an objective lens driving device is proposed in that, for example, a rounded portion is set up on a driving magnet which is included in the objective lens driving device, and distributional shape of magnetic flux density on a plane where a driving coil is disposed, becomes substantially symmetry to a peak of the magnetic flux density. It says that according to this, disbalance of forces which are generated in respective portions of the driving coils, is not generated even when the objective lens is moved for focusing and tracking and any moment with respect to center of supporting of movable portion is not generated.

However, in case of the structure disclosed in JP-A-2006-024266, because two magnets which are disposed in the objective lens driving device, have quite the same dividing manner of the region but they have a contrary polarity in magnetized pattern, and it is necessary to manufacture the two magnets separately. As a result, it causes a problem that additional cost is required to manufacture the magnets.

Further, all facing regions of the two magnets that are disposed to face each other for sandwiching the objective lens, have the same magnetic polarities. Therefore, a ratio of part where direction of the magnetic field that is formed by the magnets becomes slanted without being orthogonal to the focusing coil, is increased, it is conceivable that magnetic force of the magnet can not be effectively used.

Further in case of the structure disclosed in JP-A-2002-237067, because it has a structure in that the rounded portion is set up in the driving magnets, processing step for the magnet is increased and it becomes to add load in manufacturing process, in addition, it causes a problem that manufacturing cost is increased.

SUMMARY OF THE INVENTION

In view of the above described problems, it is an object of the present invention to provide an objective lens driving device in that the tilting of the objective lens by the harmful torque can be suppressed, and it is easy to manufacture. Further, it is another object of the present invention to provide an optical disc apparatus in which recording performance and reproducing performance are improved by including the above described objective lens driving device.

To attain the above described object an objective lens driving device in accordance with the present invention includes: an objective lens; a lens holder which holds the objective lens; two magnets which are disposed facing each other to sandwich the lens holder; focusing coils which are fixed on the lens holder to generate driving force in focusing direction by electromagnetic force action with the magnets; tracking coils which are fixed on the lens holder to generate driving force in tracking direction by electromagnetic force action with the magnets; and an elastic supporting member which supports the lens holder in displaceable manner, and the device is characterized by a structure in which on a surface of the lens holder which faces to the magnet, one of the focusing coils and two of the tracking coils are set up to align in a direction that is parallel to the tracking direction with the focusing coil being as a center, the magnets are magnetized as multipole magnets such that two effective portions which are sides of the focusing coil that face each other to generate the driving force, act with magnetic fields which have respectively different directions, and such that two effective portions which are sides of the tracking coils that face each other to generate the driving force, act with magnetic fields which have respectively different directions, and the two magnets are disposed such that N-S polarity of them become inverse at a part of the surfaces which face each other.

According to the present invention, the device has a structure that does not generate harmful torque as little as possible by specific designing for configuration of magnets. By the arrangement, it is possible to suppress tilting of the objective lens. Further, it does not happen that operation when the magnet is manufactured is burdensome in comparison with the conventional one because the magnets used are only multipole magnetized magnets which have specific configuration. As a result, it is easy to manufacture the objective lens driving device in accordance with the present invention. In addition, because the objective lens driving device according to the present invention is structured such that N-S polarity of the two magnets becomes inverse at a part of the surfaces which face each other, it is easy for magnetic field of the magnets to become substantially orthogonal to coils at the part. As a result, it is possible to increase efficiency of electromagnetic force action of the objective lens driving device.

Further, it is preferable that the present invention has a structure in that the magnets are multipole magnetized magnets that are composed of a first region which has a rectangular parallelepiped shape, a second region which is formed in a substantially U shaped cross section to surround the first region and has an inverse N-S polarity with respect to the first region, and a third region that is composed of two rectangular parallelepiped shape regions which are formed to sandwich the second region and that has the same N-S polarity with respect to the first region in the objective lens driving device which is structured as above described.

According to the present invention it is possible to realize a structure in that surfaces which face each other have inverse polarity at a part for two magnets by changing disposal direction of one kind of magnet. As a result, it is possible to manufacture an objective lens driving device that can suppress tilting of the objective lens with low cost.

Still further the present invention is characterized by an optical disc apparatus in which an objective lens driving device that is structured as above described is arranged.

According to the present invention, tilting of the objective lens can be suppressed when recording or reproducing is performed because in the optical disc apparatus the objective lens driving device which is structured as above described is arranged. As a result, it becomes possible to provide an optical disc apparatus which has improved recording performance and reproducing performance.

DETAILED DESCRIPTION OF THE PREFERRED EMBODIMENTS

Hereinafter an embodiment of the present invention will be explained with reference to drawings. At this point the embodiment shown here is mere one example and the present invention is not limited to the embodiment shown here. In this explanation description will be given in order of a gross structure of an optical disc apparatus in which an objective lens driving device according to the present invention is arranged, and a structure of the objective lens driving device according to the present invention.

[Gross Structure of an Optical Disc Apparatus]

Figure 1:
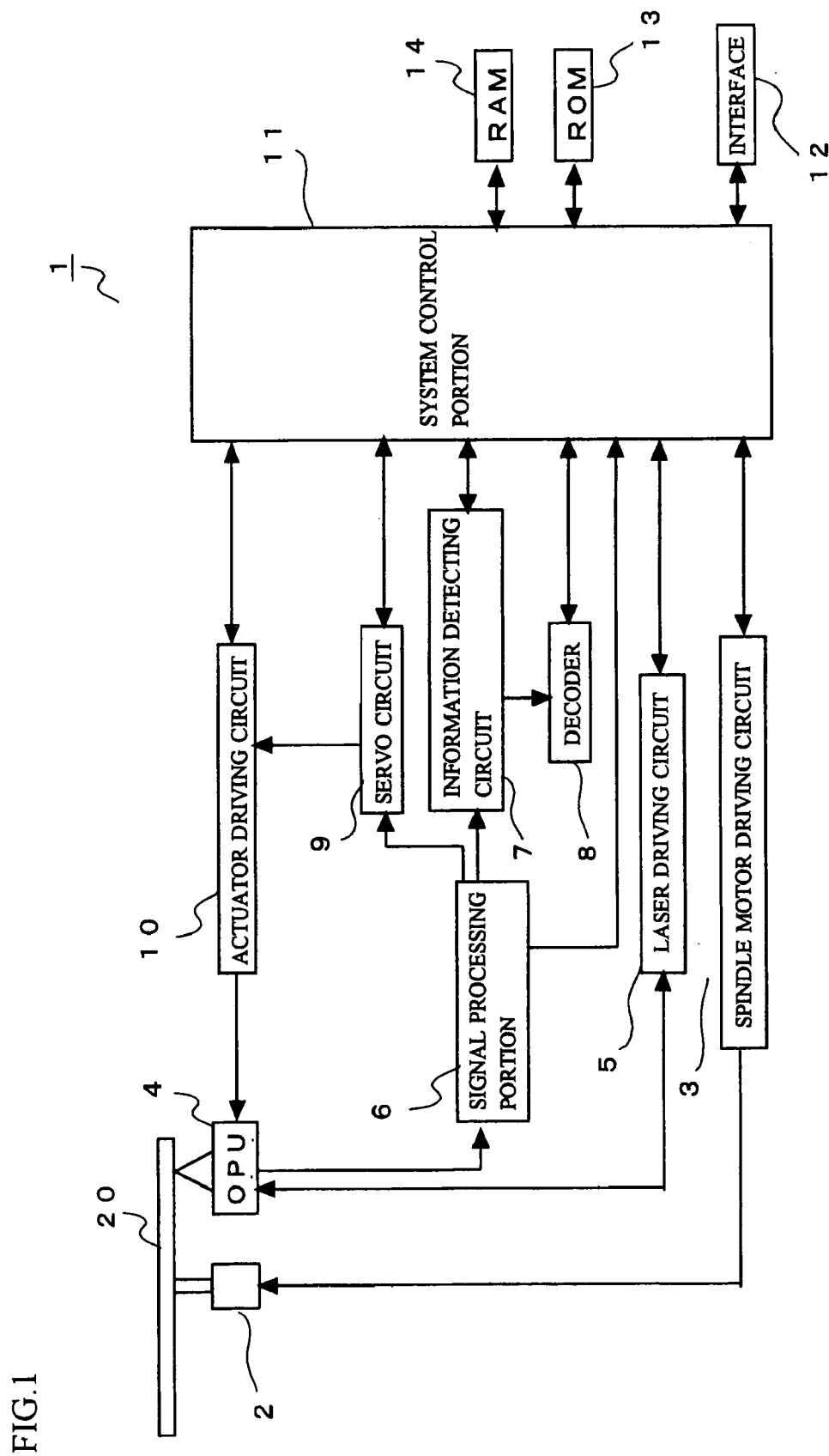
FIG. 1 is a block diagram to show a structure of an optical disc apparatus according to the present embodiment.

FIG. 1 is a block diagram to show a structure of an optical disc apparatus according to the present embodiment. The optical disc apparatus 1 is set up to be capable of reproducing of information which is recorded on an optical disc (optical recording medium) 20. At this point the optical disc apparatus 1 can perform reproducing of information which is recorded in three kinds of optical discs of a BD, a DVD, and a CD.

Reference numeral 2 designates a spindle motor and the optical disc 20 is held detachably by a chuck portion (not shown) which is set up above the spindle motor 2. The spindle motor 2 continuously rotates the optical disc 20 when reproducing of information which is recorded on the optical disc 20, is performed. Rotation control of the spindle motor 2 is performed by a spindle motor driving circuit 3.

Figure 2:
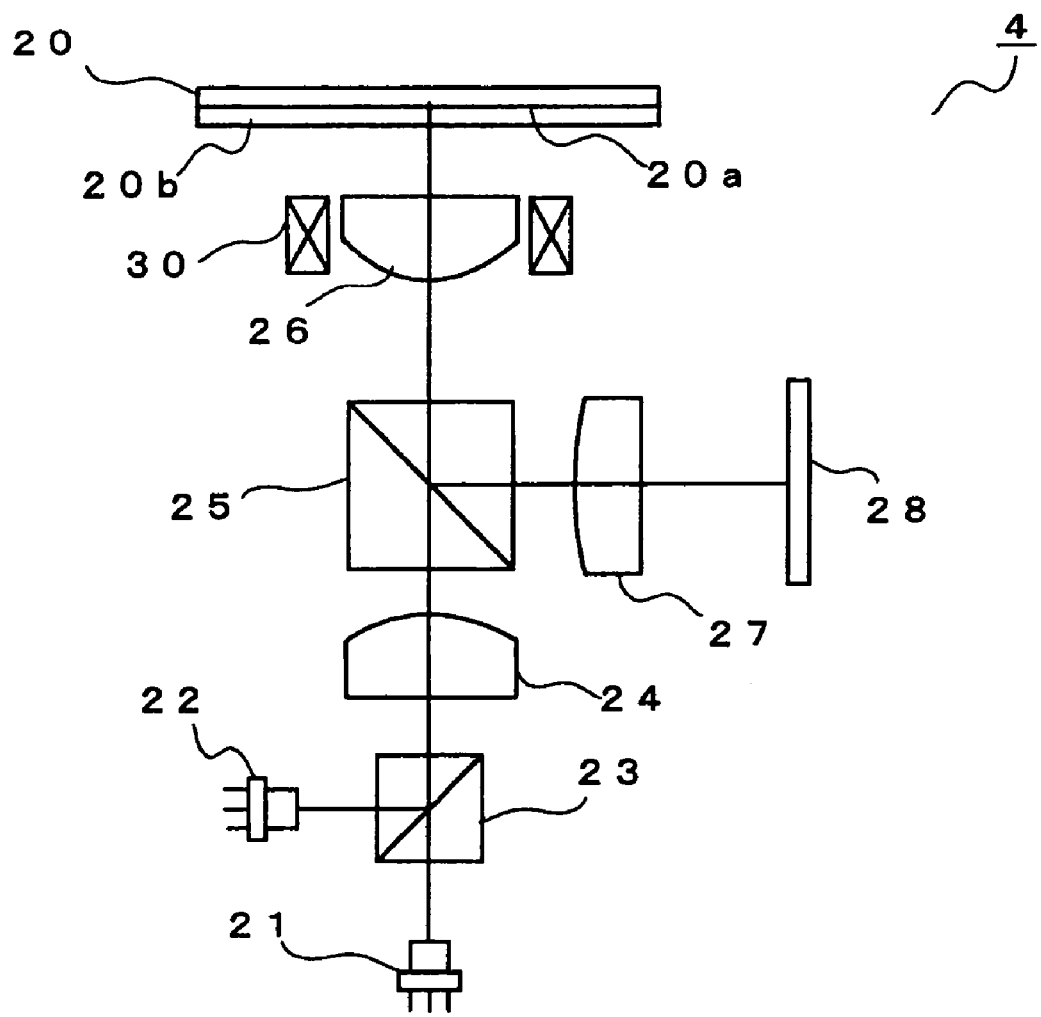
FIG. 2 is a schematic diagram to show a structure of an optical system of an optical pickup which is arranged in the optical disc apparatus according to the present embodiment.

Reference numeral 4 designates an optical pickup, which irradiates a laser beam that is emitted from a light source to the optical disc 20 to make reading of information which is recorded on the optical disc 20, possible. FIG. 2 is a schematic diagram to show an optical system of the optical pickup 4. As shown in FIG. 2, the optical pickup 4 is equipped with a first light source 21, a second light source 22, a dichroic prism 23, a collimator lens 24, a beam splitter 25, an objective lens 26, a condenser lens 27, and a photo detector 28. At this point, a structure of the optical system by which the optical pickup is structured, is not limited to the above described example, and various modifications can be introduced, of course.

The first light source 21 is a laser diode which emits a laser beam having single wavelength, and it emits the laser beam having a wavelength of 405 nm band which is used for a BD. The second light source 22 is a laser diode which is compatible to two wavelengths and can emit laser beams having two wavelengths, and it emits by switching the laser beams having a wavelength of 650 nm band which is used for a DVD and a wavelength of 780 nm band which is used for a CD.

In the optical pickup 4, the laser beam which is emitted from the light sources 21 or 22, passes the dichroic prism 23, and is converted into parallel ray by the collimator lens 24. The laser beam passes the beam splitter 25 and is condensed by the objective lens 26 on a recording surface 20a on which information of the optical disc 20 is recorded. A reflected beam reflected by the recording surface 20a of the optical disc 20 passes the objective lens 26, is reflected by the beam splitter 25, and is condensed by the condenser lens 27 on a photo receiving region in the photo detector 28. The photo detector 28 converts received light information into electric signal.

Now back to FIG. 1, a laser driving circuit 5 performs switching of the first light source 21, and the second light source 22 in response to kind of the optical disc 20 which is loaded in the optical disc apparatus 1, and the laser driving circuit 5 also performs output control of the laser beam which is emitted from the light sources 21, 22 based on information from a photo receiving element (not shown) for front monitoring.

A signal processing portion 6 is supplied electric signal from the photo detector 28 (See, FIG. 2), and performs processing of the supplied electric signal to generate RF signal, focus error signal (FE signal), and tracking error signal (TE signal).

An information detecting circuit 7 performs processing of waveform equalization and the like on the RF signal which is supplied from the signal processing portion 6 to perform reading out of the information which is recorded on the optical disc 20. The information read out by the information detecting circuit 7 is demodulated by a decoder 8, and the demodulated reproducing signal is output to external devices such as a personal computer and the like via an interface 12.

A servo circuit 9 performs generation of focus driving signal and tracking driving signal based on the FE signal and the TE signal which are generated by the signal processing portion 6.

An actuator driving circuit 10 controls driving of objective lens driving device 30 (See, FIG. 2) on which the objective lens 26 (See, FIG. 2) is mounted, based on signal such as the focus driving signal, the tracking driving signal, and the like which are supplied from the servo circuit 9. A detail of the objective lens driving device 30 will be described later.

A system control portion 11 includes a microcomputer to adequately perform control processes in response to required operations which are achieved by respective portions composing the optical disc apparatus 1.

In a system control portion 11, Read Only Memory (ROM) 13 and Random Access Memory (RAM) 14 are set up. In the ROM 13, various parameters and operating programs which are required for the system control portion 11 to achieve various processes, are stored. The RAM 14 is used as a working region for the system control portion 11 and it is made as a storing region for various kinds of data.

[Structure of the Objective Lens Driving Device]

Figure 3:
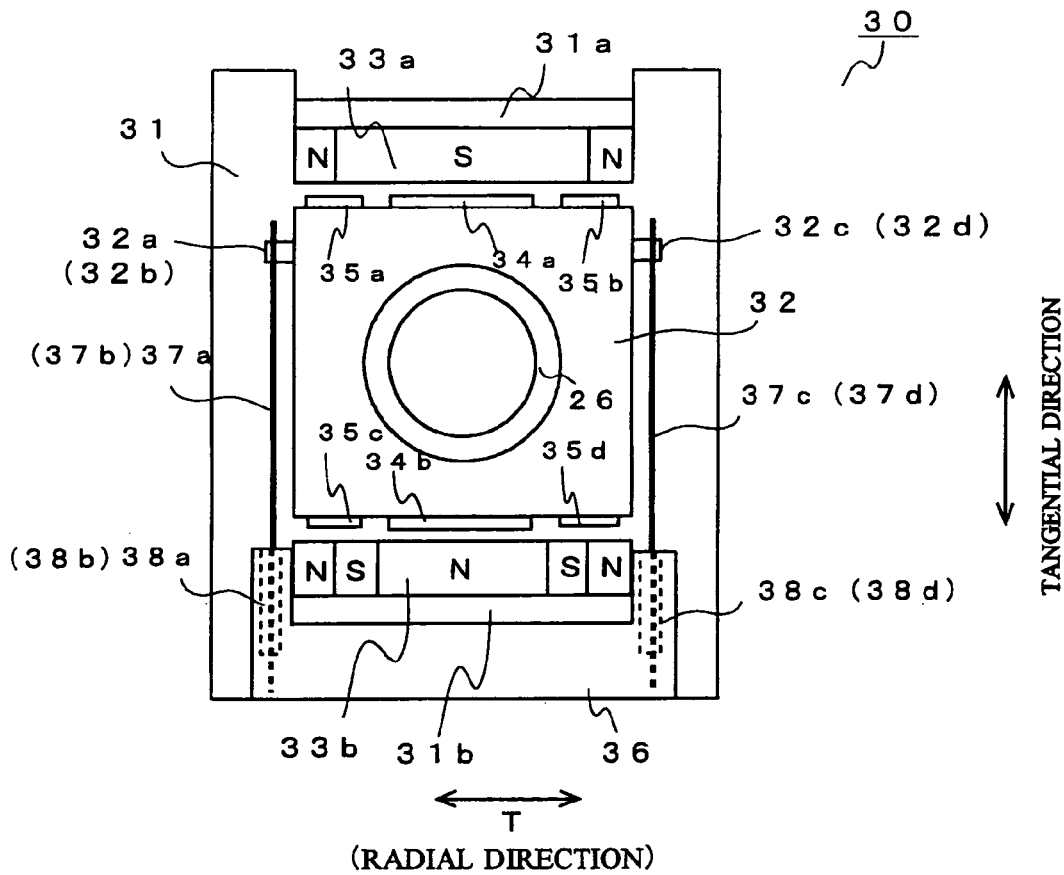
FIG. 3 is a schematic plan view to show a structure of an objective lens driving device according to the present embodiment when viewed from top.
Figure 4:
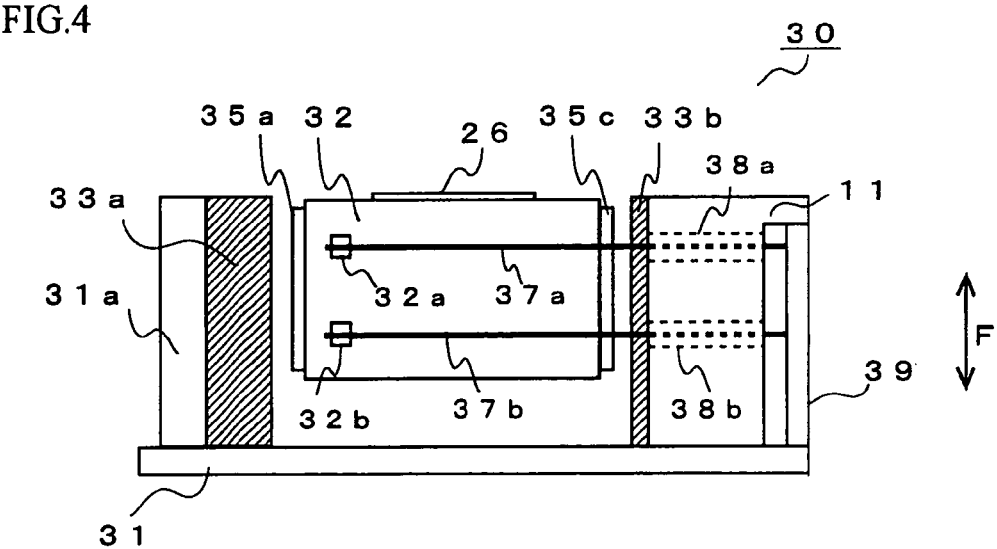
FIG. 4 is a schematic side view to show a structure of the objective lens driving device according to the present embodiment when viewed from a side.

Next, a structure of the objective lens driving device 30 according to the present embodiment will be explained. FIG. 3 is a schematic plan view to show a structure of an objective lens driving device 30 when viewed from top. FIG. 4 is a schematic side view to show a structure of the objective lens driving device 30 when viewed from a side. Hereinafter an explanation on the objective lens driving device 30 according to the present embodiment will be given with reference to mainly FIG. 3 and FIG. 4.

The objective lens driving device 30 is mainly composed of a base member 31 which is made by metal having ferromagnetism and a lens holder 32 which is made by molded resin. In approximately center of the base member 31, a through hole (not shown) to pass a laser beam is formed, and above the through hole, the lens holder 32 detail of which will be described later is disposed. Further, on the base member 31, a pair of permanent magnets 33a, 33b which face each other with a predetermined distance so as to sandwich the lens holder 32, are disposed to stand. On outer surfaces of the permanent magnets 33a, 33b, raised portions 31a, 31b which are formed by bending the base member 31, are disposed and the permanent magnets 33a, 33b and the raised portions 31a, 31b are fixed magnetically with each other.

Figure 5:
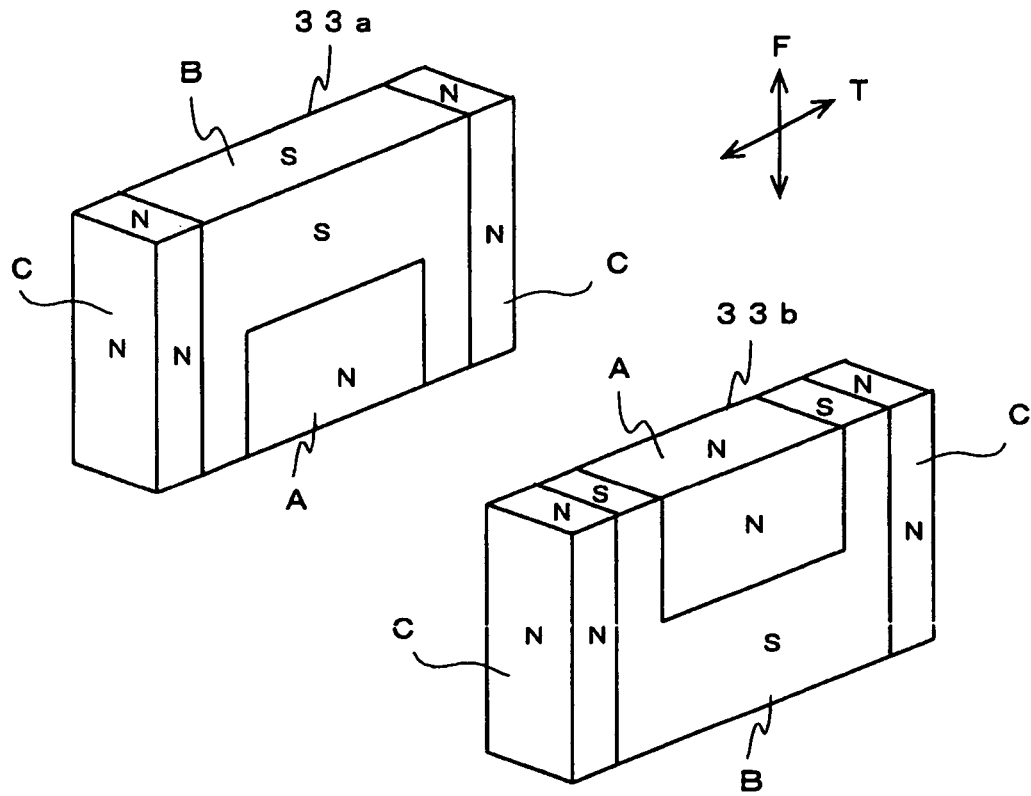
FIG. 5 is a schematic perspective view to show a structure of a permanent magnet which is arranged in the objective lens driving device according to the present embodiment.

FIG. 5 is a schematic perspective view to show a structure of permanent magnets 33a, 33b which are arranged in the objective lens driving device 30. Both of the permanent magnets 33a, 33b are multipole magnetized magnets in a rectangular parallelepiped shape. Both of the permanent magnets 33a, 33b are composed of a first region A which has a pole N in a rectangular parallelepiped shape, a second region B which is formed in a substantially U shaped cross section to surround the first region A and has a pole S, and a third region C which is composed of two rectangular parallelepiped shapes and formed to sandwich the second region B and has a pole N.

As shown in FIG. 5, the permanent magnet 33b is disposed to stand on the base member 31 in a state that the permanent magnet 33a is set in upside down. As a result the first region A of the permanent magnet 33a faces to the second region B of the permanent magnet 33b and the first region A of the permanent magnet 33b faces to the second region B of the permanent magnet 33a. Because N-S polarity of the first region A and the second region B are inverse, magnetic field is generated substantially straightly from the permanent magnet 33a to the permanent magnet 33b or from the permanent magnet 33b to the permanent magnet 33a. At this point as for other portions, because the same poles face together, directions of the magnetic fields do not become the state as above described.

In this embodiment the first region A and the third region C of the permanent magnets 33a, 33b are set in the pole N and the second region B is set in the pole S, however, the present invention is not intended to limit this embodiment. That is to say, it is no problem that the first region A and the third region C are set in the pole S and the second region B is set in the pole N.

On the base member 31, outside of the raised portion 31b on inside of which the permanent magnets 33b is fixed magnetically, a gel holder 36 which is formed by molded resin such as polycarbonate or the like is fixed, and in addition, a circuit board 39 is disposed to stand adjoining to outside of the gel holder 36. Each one end of wires 37a, 37b, 37c, 37d which have conductivity are connected by soldering in two points of upper and lower directions in left and right sides of this circuit board 39, respectively. Each of these four wires 37a-37d are inserted into through holes 38a, 38b, 38c, 38d which are formed in the gel holder 36, at corresponding positions to the connected positions to the circuit board 39, that is, two positions of upper and lower directions in left and right sides, respectively.

Other ends of the wires 37a, 37c which are in the upper side, are fixed in a state that they are electrically connected with the focusing coils 34a, 34b whose detail will be explained later, by soldering at wire support portions 32a, 32c which are set up in the lens holder 32. Further, other ends of the wires 37b, 37d which are in the lower side, are fixed in a state that they are electrically connected with the tracking coils 35a-35d whose detail will be explained later, by soldering at wire support portions 32b, 32d which are set up in the lens holder 32. By these arrangements, the lens holder 32 is supported in swingable manner on the base member 31 by the respective wires 37a-37d.

At this point in the present embodiment, number of wires to support the lens holder 32 is four, however, the present invention is not intended to limit this embodiment. That is to say, it is no problem that the number of wires is adequately changed as far as they can support properly the lens holder 32 and the lens holder 32 can be moved adequately.

In addition, insides of each of the through holes 38a-38d of the gel holder 36 through which each of the wires 37a-37d is inserted, gel material which has silicone as main component, is filled. At this point, the gel material is formed by injecting low viscosity gel material (sol) into the respective through holes 38a-38d of the gel holder 36 and irradiating it with ultraviolet rays for a predetermined period of time so that the material is cured into a gel state. This gel holder 36 plays a role of attenuating and suppressing vibration that is generated in each of the wires 37a-37d in response to driving of the lens holder 32, by the gel material.

A light path hole (not shown) which extends in perpendicular direction to a paper surface of FIG. 3, is formed in central part of the lens holder 32 in order to pass the laser beam, and the objective lens 26 is held by an objective lens holding portion (not shown) which is set up in upper side of a cavity. At this point the objective lens 26 which is mounted on the lens holder 32, is mounted such that an optical axis of it becomes parallel to a direction which is perpendicular to the paper surface of FIG. 3.

On outside of side wall which faces to the permanent magnet 33a among the side walls of the lens holder 32, one focusing coil 34a and two tracking coils 35a, 35b are fixed on the lens holder 32 by an adhesive or the like. Further, on outside of side walls which face to the permanent magnet 33b among the side wall of the lens holder 32, also, one focusing coil 34b and two tracking coils 35c, 35d are fixed on the lens holder 32 by an adhesive or the like such that they are disposed in symmetrical position with the focusing coil 34a and two tracking coils 35a, 35b which are disposed on the outside of the side wall that face to the permanent magnet 33a.

Figure 6:
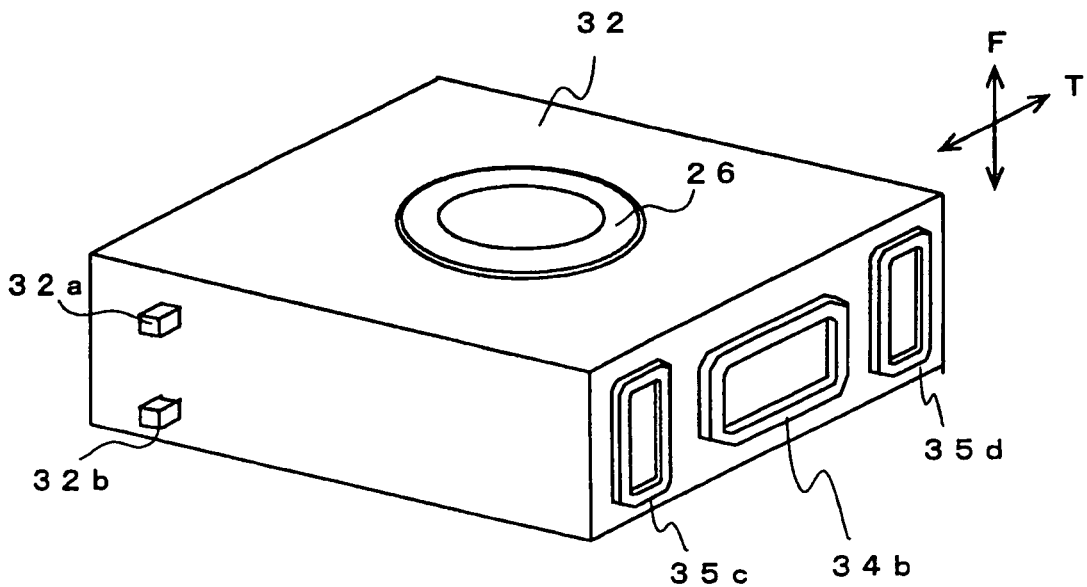
FIG. 6 is a schematic perspective view to show a structure of a lens holder which is arranged in the objective lens driving device according to the present embodiment.

FIG. 6 is a schematic perspective view to show a structure of the lens holder 32 which is arranged in the objective lens driving device 30. As shown in FIG. 6, the focusing coil 34b and the tracking coils 35c, 35d which are fixed on the lens holder 32, are disposed to align in a direction that is parallel to the tracking direction (direction shown by an arrow T in FIG. 6) with the focusing coil 34b being as a center. Further, though they are not shown in FIG. 6, the focusing coil 34a and the tracking coils 35a, 35b are disposed similarly.

At this point, the focusing coil 34a and the focusing coil 34b are connected by one wire as a whole, and the tracking coils 35a-35d are also connected by one wire as a whole.

Figure 7A:
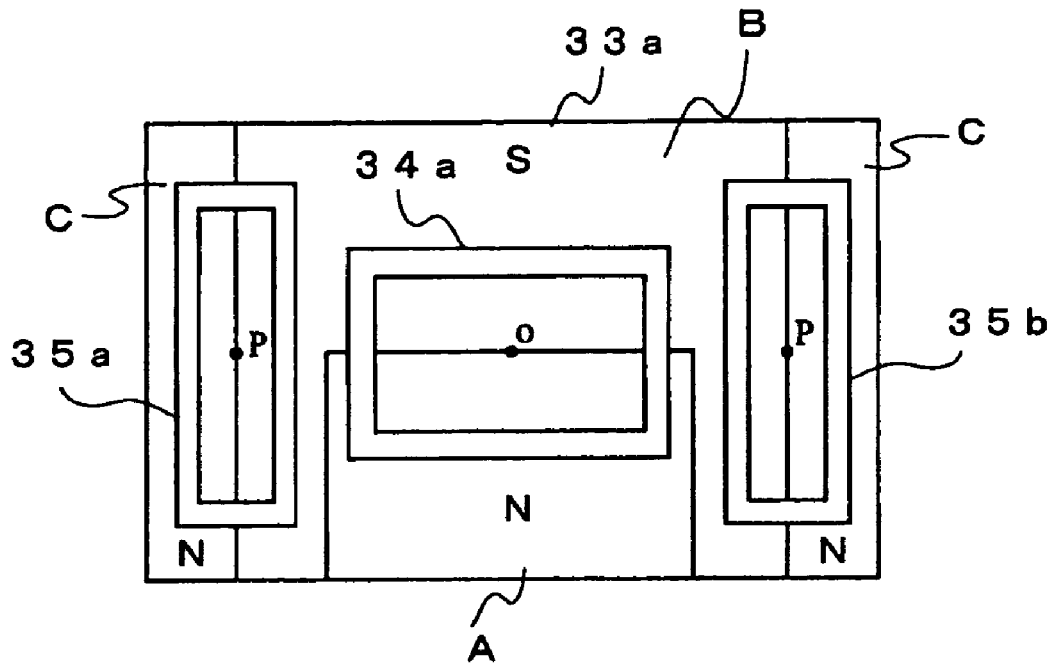
FIG. 7A is a diagram to explain positional relation among a focusing coil, tracking coils, and a permanent magnet in the objective lens driving device according to the present embodiment.
Figure 7B:
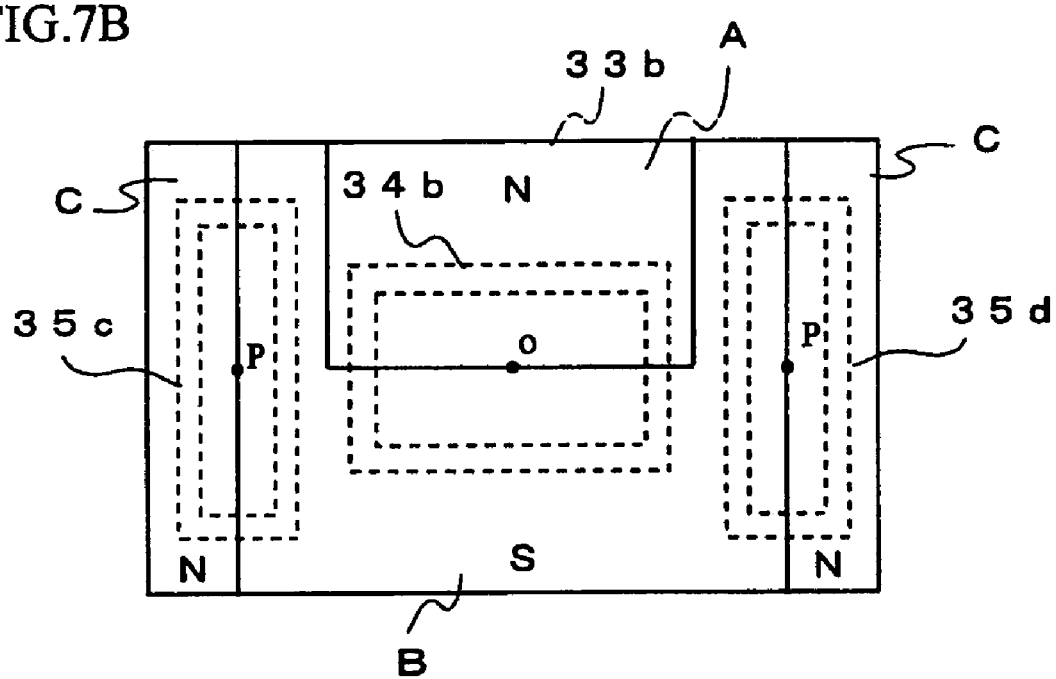
FIG. 7B is a diagram to explain positional relation among a focusing coil, tracking coils, and a permanent magnet in the objective lens driving device according to the present embodiment.

Next, positional relation among the focusing coils 34a, 34b, the tracking coils 35a-35d, and the permanent magnets 33a, 33b will be explained with reference to FIG. 7A and FIG. 7B. FIG. 7A is a diagram to explain positional relation among the focusing coil 34a, the tracking coils 35a, 35b, and the permanent magnet 33a. FIG. 7B is a diagram to explain positional relation among the focusing coil 34b, the tracking coils 35c, 35d and the permanent magnet 33b. At this point FIG. 7A and FIG. 7B are diagrams when they are viewed from the same direction that goes from below to above in FIG. 3. Further in FIG. 7B, the focusing coil 34b and the tracking coils 35c, 35d are shown in dotted line, because they exist in back side of the magnet.

As shown in FIG. 7A, the focusing coil 34a is disposed such that one of its longer side overlaps with the first region A of the permanent magnet 33a, and the other longer side overlaps with the second region B of the permanent magnet 33a. Further, the focusing coil 34a is disposed such that a line which divides its shorter side in two equal parts and passes a center of the coil "O", overlaps with a border line of the first region A and the second region B of the permanent magnet 33a. In this case, one half of the shorter side of the focusing coil 34a overlaps with the first region A of the permanent magnet 33a and the other half of the shorter side overlaps with the second region B.

At this point, the focusing coil 34b is also disposed with respect to the permanent magnet 33b in the same positional relation as that of the focusing coil 34a and the permanent magnet 33a as shown in FIG. 7B.

Further as shown in FIG. 7A, the tracking coils 35a, 35b are disposed such that one of their longer side overlaps with the second region B of the permanent magnet 33a, and the other longer side overlaps with the third region C of the permanent magnet 33a. Further, the tracking coils 35a, 35b are disposed such that a line which divides their shorter side in two equal parts and passes a center of the coil "P", overlaps with a border line of the second region B and the third region C of the permanent magnet 33a. In this case, one half of the shorter side of the tracking coils 35a, 35b overlaps with the second region B of the permanent magnet 33a and the other half of the shorter side overlaps with the third region C.

At this point, the tracking coils 35c, 35d are also disposed with respect to the permanent magnet 33b in the same positional relation as that of the tracking coils 35a, 35b and the permanent magnet 33a as shown in FIG. 7B.

Figure 8A:
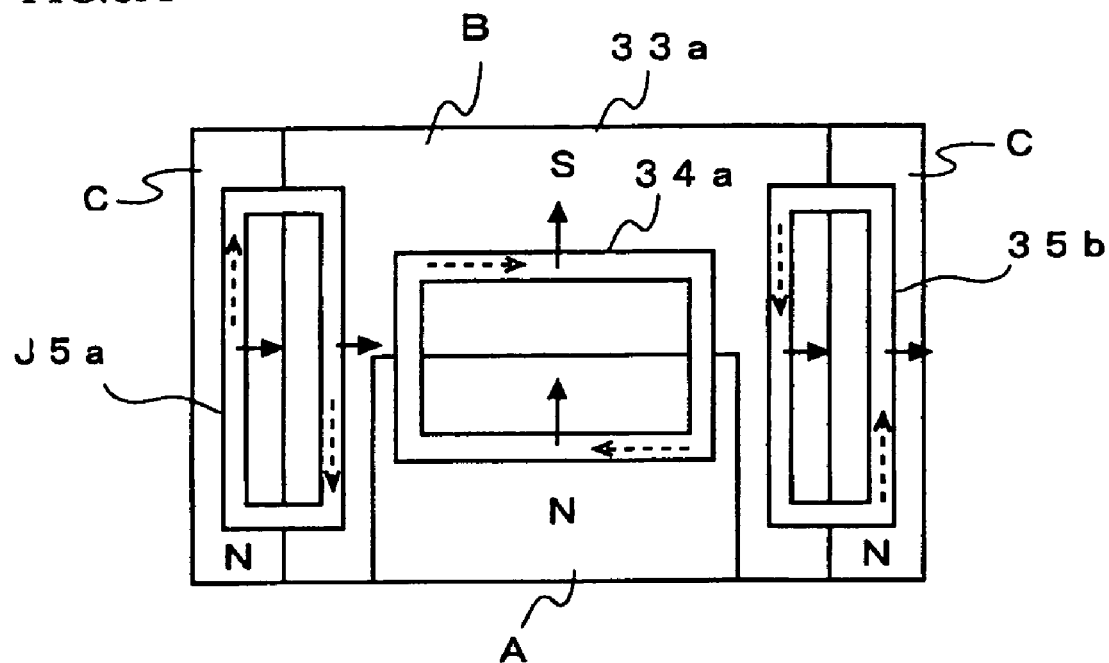
FIG. 8A is a diagram to explain about driving forces which are generated in a focusing coil, and tracking coils that are arranged in the objective lens driving device according to the present embodiment.
Figure 8B:
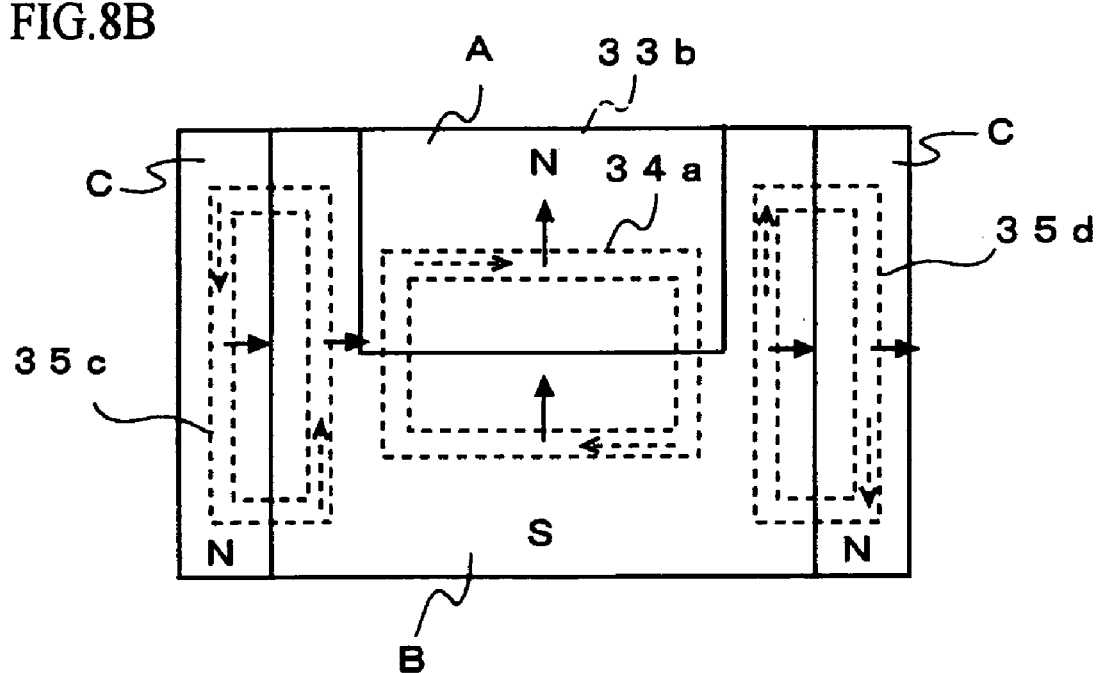
FIG. 8B is a diagram to explain about driving forces which are generated in a focusing coil, and tracking coils that are arranged in the objective lens driving device according to the present embodiment.

Next, operation of the objective lens driving device 30 structured as above described, will be explained. FIG. 8A and FIG. 8B are diagrams to explain about driving forces which are generated in the focusing coils 34a, 34b and the tracking coils 35a-35d that are arranged in the objective lens driving device 30. FIG. 8A is a diagram to explain about driving forces which are generated in a focusing coil 34a and tracking coils 35a, 35b, and FIG. 8B is a diagram to explain about driving forces which are generated in a focusing coil 34b and tracking coils 35c, 35d. At this point FIG. 8A and FIG. 8B are similar drawings to FIG. 7A and FIG. 7B, and FIG. 8A and FIG. 8B are drawings that direction of electric current which passes the coils (dotted line arrow) and direction of driving forces which are generated in the respective coils (solid line arrow), are added.

An explanation will be given about driving forces which are generated in the focusing coils 34a, 34b and the tracking coils 35a-35d when the electric current passes in the direction shown in FIG. 8A and FIG. 8B.

First, explanation about the driving force that is generated in the focusing coils 34a, 34b will be given. Though directions of the electric current which passes the coils become inverse between upper side and lower side of the longer side of the focusing coils 34a, 34b, forces (force by electromagnetic force action) of the same direction (direction shown with arrow in the drawing) are generated according to Fleming's left hand rule because directions of magnetic fields which act on the respective longer sides are inverse. On the other hand, as for the shorter sides of the focusing coils 34a, 34b, no driving force is generated in the shorter sides because the driving forces that are generated in the shorter sides which face each other, of the respective coils, have inverse directions and the forces that are generated in the shorter sides of the coils are cancelled as a whole. That is to say, in the focusing coils 34a, 34b, the longer sides functions as an effective portion which generates the driving forces, and by these, driving force in the focusing direction F (See, FIG. 4) is generated.

At this point the focusing coils 34a, 34b are connected by one wire as above described, and the focusing coil 34a and the focusing coil 34b are wound such that driving forces having the same direction are generated in both of them when the electric current passes the focusing coils.

Further in the tracking coils 35a-35d, though directions of the electric current which passes the coils become inverse between left side and right side of the longer side, forces (force by electromagnetic force action) of the same direction (direction shown with arrow in the drawing) along the tracking direction are generated according to Fleming's left hand rule because directions of magnetic fields which act on the respective longer sides are inverse. On the other hand, as for the shorter sides of the tracking coils 35a-35d, no driving force is generated in the shorter sides because the driving forces that are generated in the shorter sides which face each other, of the respective coils, have inverse directions and the forces that are generated in the shorter sides of the coils are cancelled as a whole. That is to say, in the tracking coils 35a-35d, the longer sides functions as an effective portion which generates the driving forces, and by these, driving force in the tracking direction T (See, FIG. 3) is generated.

At this point the tracking coils 35a-35d are connected by one wire as above described, and the respective tracking coils 35a-35d are wound such that driving forces having the same direction are generated in the respective coils when the electric current passes the tracking coils.

As above described, in the objective lens driving device 30, the objective lens 26 can be driven with the lens holder 32 because the driving forces having a certain direction are generated in the focusing coils 34a, 34b, and the tracking coils 35a-35d, by passing electric current in the focusing coils 34a, 34b, and the tracking coils 35a-35d. As a result by changing directions of electric currents which pass the focusing coils 34a, 34b, and the tracking coils 35a-35d, directions of the driving forces which are generated in the respective coils are changed, and moving direction of the lens holder 32 can be controlled.

As above described, for the permanent magnets 33a, 33b which are arranged in the objective lens driving device 30 according to the present embodiment, one of them is disposed upside down with respect to the other. In this case because the direction of the magnetic field of a part at which the focusing coils 34a, 34b are disposed, is substantially orthogonal to side of the coils, it has a merit that magnetic forces of the permanent magnets 33a, 33b can be used effectively for the driving force of the focusing coils 34a, 34b. Further, it can be prevented that the driving forces which are generated in the tracking coils 35a-35d, become an unbalanced state and the objective lens is made tilted in case where the lens holder 32 is moved along the tracking direction. About the latter case, explanation will be given with reference to FIG. 9A and FIG. 9B.

Figure 9A:
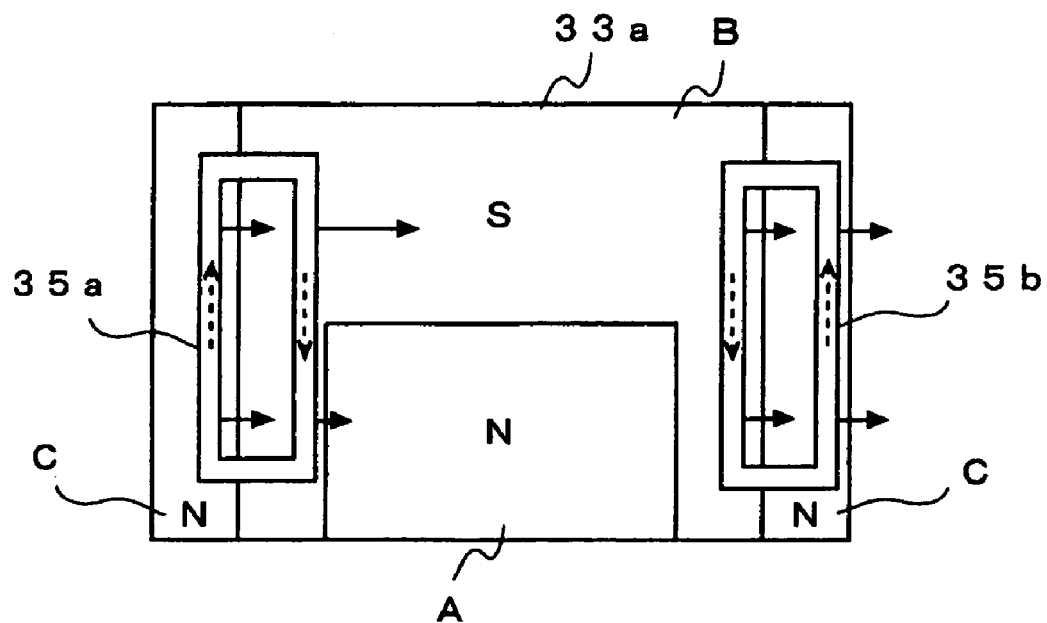
FIG. 9A is a diagram to explain driving forces which are generated in the tracking coils in a state when the lens holder in the objective lens driving device according to the present embodiment is moved along a tracking direction.
Figure 9B:
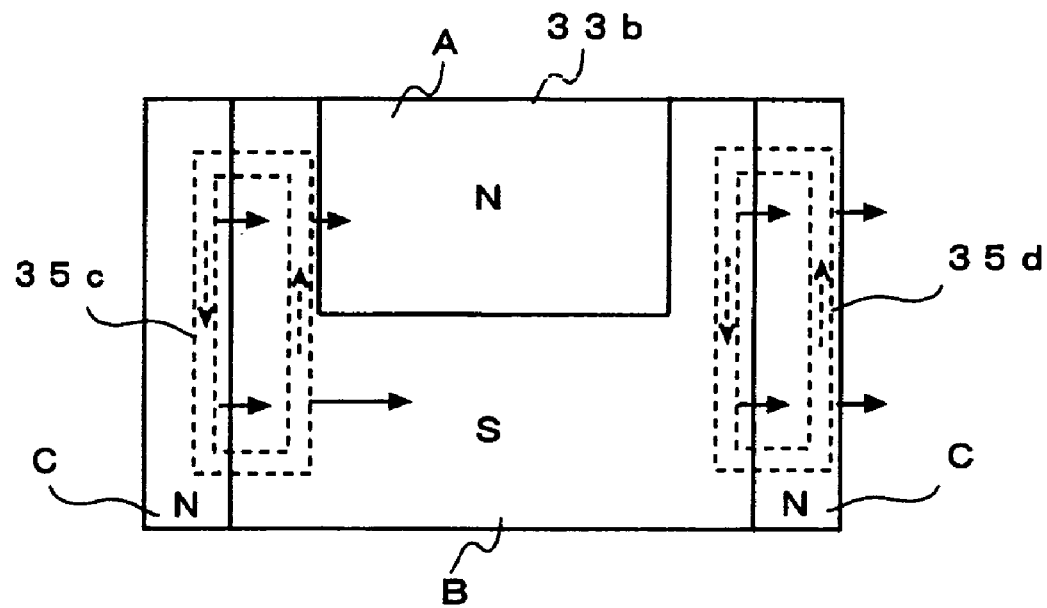
FIG. 9B is a diagram to explain driving forces which are generated in the tracking coils in a state when the lens holder in the objective lens driving device according to the present embodiment is moved along a tracking direction.

FIG. 9A and FIG. 9B are diagrams to explain the driving forces which are generated in the tracking coils 35a-35d in a state where the lens holder 32 in the objective lens driving device 30 is moved along the tracking direction. FIG. 9A is a diagram to explain the driving forces which are generated in the tracking coils 35a, 35b, and FIG. 9B is a diagram to explain the driving forces which are generated in the tracking coils 35c, 35d. At this point solid line arrows shown in FIG. 9A and FIG. 9B designate forces which are generated in the coils, and lengths of them mean their magnitude schematically for the sake of convenience in explanation. Further, dotted line arrows shown in FIG. 9A and FIG. 9B designate directions of electric currents which pass the tracking coils.

When the lens holder 32 is moved along the tracking direction (in FIG. 9A and FIG. 9B a state is shown that the lens holder 32 shown in FIG. 3 is moved in right direction) and the effective portions of the tracking coils 35a-35d come closer to borders of regions which have different N-S polarities, or come closer to end portion of the magnet, forces that are generated in the coils at those parts by the electromagnetic force action, become smaller because of decrease in the magnetic flux density distribution.

In case of the present embodiment, when the state shown in FIG. 9A and FIG. 9B is realized, the magnetic flux density distribution of upper side and lower side of the coils becomes different state in one of the two effective portions of the tracking coil 35a and the tracking coil 35c. Because of this, in the tracking coil 35a, the force that is generated by the electromagnetic force action in the upper side of the coil becomes larger than that in the lower side of the coil as shown in FIG. 9A. As a result, an unbalanced state is caused in the driving forces which are generated in the coils, and torque to rotate the lens holder 32 (See, FIG. 3) clockwise is generated.

On the other hand in the tracking coil 35c, as shown in FIG. 9B, the force that is generated by the electromagnetic force action in the lower side of the coil becomes larger than that in the upper side of the coil. As a result, an unbalanced state is caused in the driving forces which are generated in the coils, and torque to rotate the lens holder 32 counterclockwise is generated. Therefore, two torques which have different rotational directions are generated in the lens holder 32 and both torques are cancelled with each other, rotation of the lens holder 32 (that is, tilting of the objective lens 26) can be suppressed.

At this point, in case where a structure in that the permanent magnet 33b is rotated inversely with respect to the permanent magnet 33a such as the present embodiment, is not employed, rotating torques which are caused by the unbalanced state of forces that are generated in the tracking coil 35a and the tracking coil 35c, have the same direction and they rotate the lens holder 32, as a result, the objective lens 26 is tilted.

Figure 10:
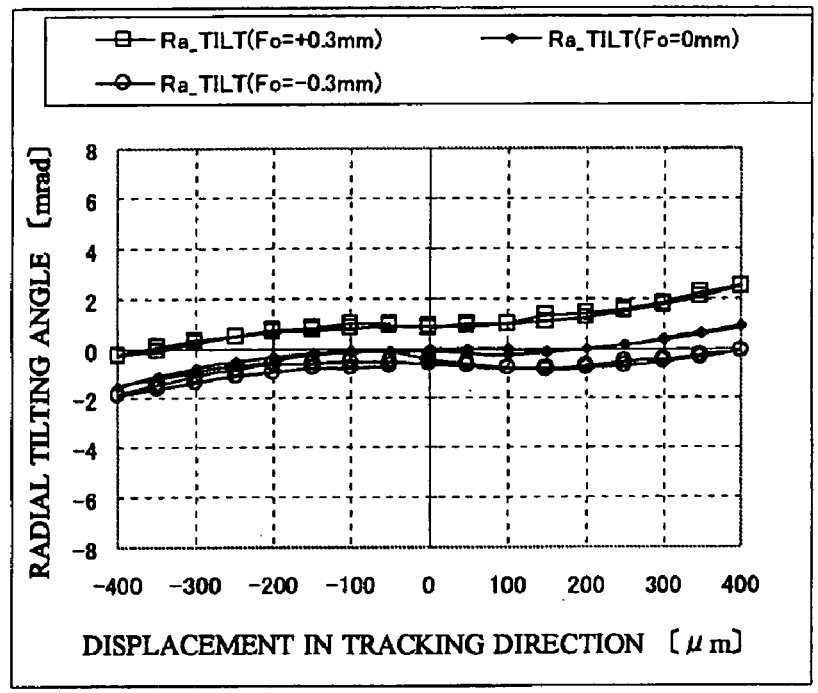
FIG. 10 is a graph to show a tilting characteristic of the objective lens in the objective lens driving device according to the present embodiment.
Figure 11:
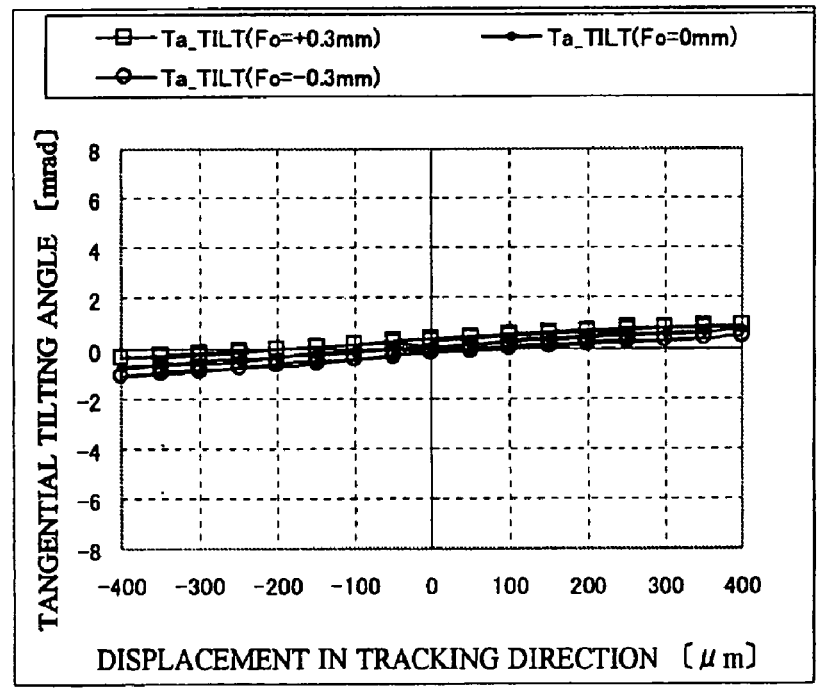
FIG. 11 is a graph to show a tilting characteristic of the objective lens in the objective lens driving device according to the present embodiment.

FIG. 10 and FIG. 11 are graphs to show a tilting characteristic of the objective lens 26 in the objective lens driving device 30 according to the present embodiment.

FIG. 10 shows tilting angles (radial tilting angle) of the objective lens 26 in the radial direction (See, FIG. 3) when the objective lens 26 is moved ±0.4 mm along the tracking direction in the states that offset in the focusing direction are +0.3 mm, 0 mm, and −0.3 mm. FIG. 11 shows the tilting angles (tangential tilting angle) of the objective lens 26 in the tangential direction (See, FIG. 3) when the objective lens 26 is moved +0.4 mm along the tracking direction in the states that offset in the focusing direction are +0.3 mm, 0 mm, and −0.3 mm.

As shown in FIG. 10 and FIG. 11, in the objective lens driving device 30 according to the present embodiment, both of the radial tilting and the tangential tilting can be suppressed small when the objective lend driving device 30 is driven. Therefore, when the objective lens driving device 30 according to the present embodiment is utilized, it becomes possible to perform reproducing of the optical disc 20 in a state that tilting of the objective lens 26 is suppressed small, as a result, the reproducing performance of the optical disc apparatus 1 can be improved.

[Other]

In the embodiment described above, the optical disc apparatus 1 is an apparatus which can perform only reproducing of the optical disc. However, it is of course no problem that the apparatus is an optical disc apparatus which can perform both recording and reproducing, and in this case, tilting of the objective lens can be suppressed when recording is performed. Further, it is needless to say that as for the kind of the optical disc 20 to which the optical disc apparatus 1 is applied, it is not limited to the kinds described in the present embodiment, and it can be changed adequately.

By the objective lens driving device according to the present invention, tilting of the objective lens can be suppressed small. As a result, recording performance and reproducing performance of an optical disc apparatus in which an objective lens driving device according to the present invention is arranged, can be improved. Therefore, the objective lens driving device according to the present invention is very useful.

What is claimed is:

1. An objective lens driving device comprising:
an objective lens;
a lens holder which holds the objective lens;
two magnets which are disposed facing each other to sandwich the lens holder;
focusing coils which are fixed on the lens holder to generate driving force in focusing direction by electromagnetic force action with the magnets;
tracking coils which are fixed on the lens holder to generate driving force in tracking direction by electromagnetic force action with the magnets; and
an elastic supporting member which supports the lens holder in movable manner, wherein
on each of surfaces that face the two magnets, respectively, of the lens holder, one of the focusing coils and two of the tracking coils are set up to align in a direction that is parallel to the tracking direction with the focusing coil being as a center,
the two magnets are identical multipole magnetized magnets and are disposed such that one upside down relative to the other,
the multipole magnets are composed of a first region which has a rectangular parallelepiped shape, a second region which is formed around the first region to have a substantially U shaped cross section and has an opposite N-S polarity with respect to the first region, and a third region that is composed of two rectangular parallelepiped shaped regions which are formed to sandwich the second region and that has the same N-S polarity with respect to the first region,
of two effective portions which are opposite sides of the focusing coil and that generate the driving force, one is disposed to face the first region and the other is disposed to face the second region, and
of two effective portions which are opposite sides of the tracking coils and that generate the driving force, one is disposed to face the second region and the other is disposed to face the third region.

2. An optical disc apparatus in which the objective lens driving device according to claim 1 is arranged.

* * * * *